(12) United States Patent
Criscione et al.

(10) Patent No.: US 6,225,794 B1
(45) Date of Patent: *May 1, 2001

(54) STEP-UP CONTINUOUS MODE DC-TO-DC CONVERTER WITH INTEGRATED FUZZY LOGIC CURRENT CONTROL

(75) Inventors: Marcello Criscione; Luigi Occhipinti, both of Ragusa (IT)

(73) Assignee: STMicroelectronics S.r.l., Agrate Brianza (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/168,636

(22) Filed: Oct. 8, 1998

(30) Foreign Application Priority Data

Oct. 17, 1997 (EP) .................................... 97830521

(51) Int. Cl.[7] ...................................... G05F 1/40

(52) U.S. Cl. ......................... 323/283; 323/222; 323/288

(58) Field of Search .................................. 323/222, 282, 323/283, 288

(56) References Cited

U.S. PATENT DOCUMENTS

| | | | |
|---|---|---|---|
| 4,975,820 | 12/1990 | Szepesi | 363/21 |
| 5,534,766 | * 7/1996 | Bonissone et al. | 323/235 |
| 5,696,439 | * 12/1997 | Presti et al. | 323/282 |

FOREIGN PATENT DOCUMENTS 0 690 551  1/1996 (EP) .

OTHER PUBLICATIONS

Bor–Ren Lin et al., Buck/Boost Converter Control With Fuzzy Logic Approach, IEEE Institute of Electrical and Electronics Engineers, vol. 2, Nov. 15, 1993, pp. 1342–1346.

Carrasco, J.M. et al., An Analog Fuzzy Logic Controller for Power Converters, IEEE Proc. 1995 IEEE IECON; Intn'l Conf. On Indus. Elect, Control etc., vol. 2, Nov. 6, 1995, pp. 1490–1495.

Mattavelli, P. et al., General–Purpose Fuzzy Controller for DC–DC Converters, IEEE Transaction on Power Electronics, vol. 12, No. 1 pp. 79–86, Jan. 1997.

Fang Hsien Wang et al., Comparison of Fuzzy Logic and Current–Mode Control Techniques in Buck, Boost and Buck/Boost Converters, IEE Record of the Annual Ppower Elect. Spec. Conf., pp. 1079–1085, Dec. 1995.

* cited by examiner

*Primary Examiner*—Shawn Riley
(74) *Attorney, Agent, or Firm*—Wolf, Greenfield & Sacks, P.C.; James H. Morris; Theodore E. Galanthay (57) ABSTRACT

A step-up continuous-mode DC-to-DC converter with integrated current control, comprising a comparator for comparing a voltage signal output from the converter and a reference signal for generating an error signal and circuitry for generating a compensation ramp which generates a ramp signal which is added to a signal which is proportional to a current ramp that flows across the converter. The signal output from the comparator and the signal obtained from the sum are sent to an additional comparator, the output whereof, together with an oscillator signal, is used for driving a power transistor of the converter. A fuzzy logic control unit is interposed between the comparator and the additional comparator, the fuzzy logic control unit receiving at its input the error signal output by the comparator and emitting in an output signal which depends on the variation of the error signal over time to be sent to the additional

19 Claims, 9 Drawing Sheets

STEP-UP CONTINUOUS MODE DC-TO-DC CONVERTER WITH INTEGRATED FUZZY LOGIC CURRENT CONTROL

BACKGROUND OF THE INVENTION

1. Field of the Invention

The present invention relates to a step-up continuous mode DC-to-DC converter with integrated fuzzy logic current control.

2. Discussion of the Related Art

The need is increasingly felt to have integrated DC-to-DC converters featuring a high performance in terms of transient load response, a wide stability range and a low cost.

This need is particularly felt in fields of application where there is a tendency to increase integration density, minimizing the number and density of the circuit components. This is the case, for example, of converters for pagers, cellular telephones, hard disks, portable equipment and the like.

The DC-to-DC converters that may be used in accordance with the present invention are known in the literature as fixed-frequency step-up converters with duty cycle control. In most cases, duty cycle control is performed by means of a simple current-mode fedback linear adjustment diagram. The discontinuous operating mode of the converter does not entail linear control stability problems, since the closed-loop transfer function of the controller is of the first-order type, owing to the drop to zero of the inductor current, during each clock cycle. At the crossing frequency (unit loop gain), the transfer function assuredly has a phase margin of more than 90°, ensuring its stability. Moreover, in this operating mode the transfer function does not contain terms that depend on the load.

Viceversa, in continuous-mode operation the lack of a drop to zero in the inductor current introduces a tendency of the system to respond to load transients with variations of the duty cycle which tend to destabilize the controlled system. Moreover, the use of a current-mode control diagram for continuous-mode operation introduces in the transfer function a term which depends on the output load, introducing an additional phase shift which adds to the one introduced by the output LC unit, making it extremely difficult, if not virtually impossible, to achieve optimum feedback loop compensation for a wide range of load and input conditions.

The problem is particularly evident in operating conditions close to the limits of the specifications, with a highly variable load or with low supply voltages, where a high speed of response to transients in the load and in the supply voltage is required.

The problem linked to the current-mode control of a step-up converter in continuous-mode operation is usually dealt with by resorting to the so-called "current-mode with compensation ramp" method. According to this method, as shown in the block diagram of FIG. 2, a ramp signal is generated inside the circuit and is added to a signal which is proportional to the current ramp that flows across the inductor during the first step, in order to reduce the loop gain proportionally to the steady-state value of the duty cycle. In this manner, the instability problems arising for the continuous mode when the value of the duty cycle exceeds 50% are reduced considerably.

Figure 1:
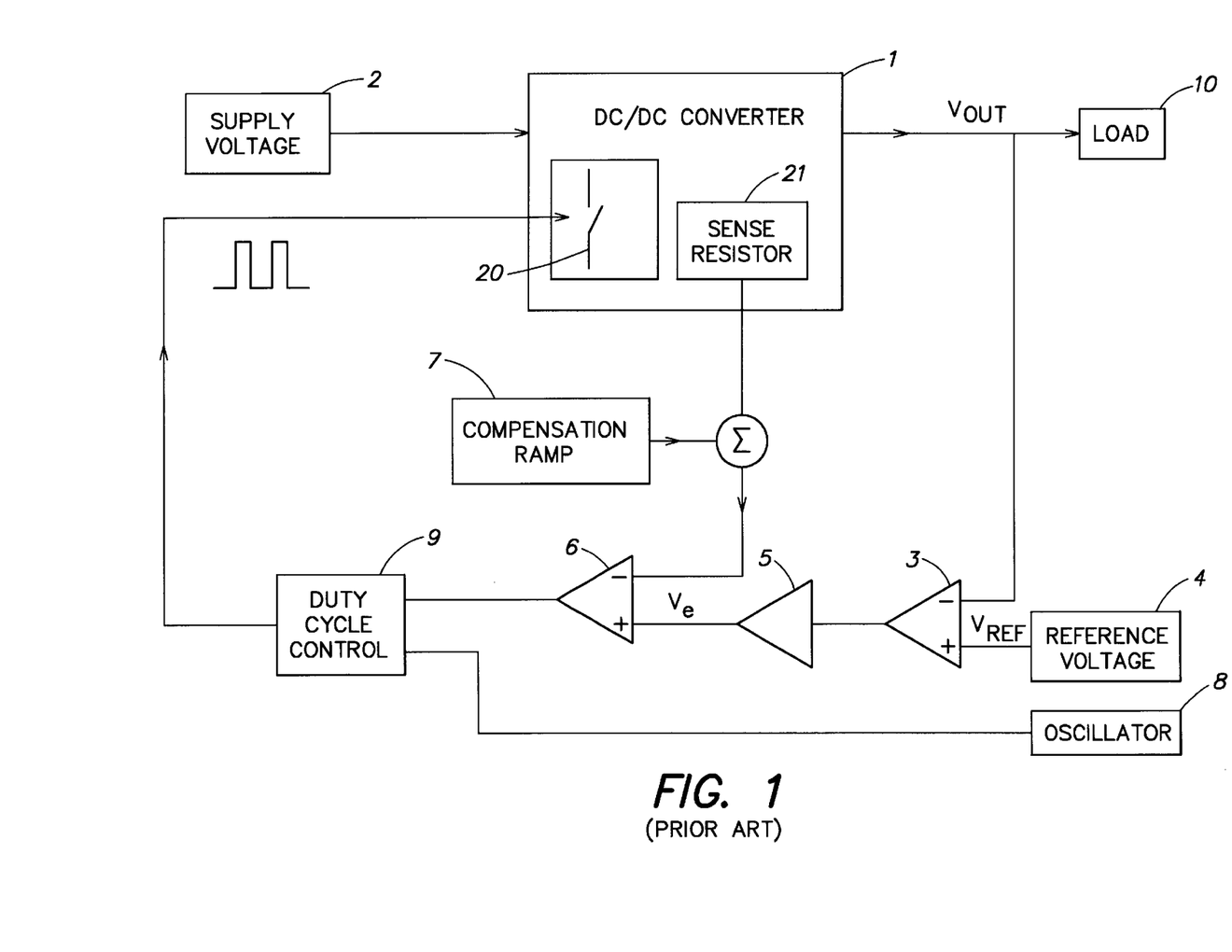
FIG. 1 is a block diagram of a DC-to-DC converter control with ramp compensation.

The block diagram shown in FIG. 1 comprises, and designates with the reference numeral 1, a DC-to-DC converter which is supplied by a supply voltage 2 with an output voltage Vout. The reference numeral 3 designates an error amplifier which receives in input the output voltage Vout together with a reference voltage Vref indicated by the block 4. A block, designated by the reference numeral 5, is cascade-connected to the error amplifier 3 and indicates the gain of the error amplifier.

The output voltage of the block 5, designated by Ve, is input to an additional comparator, designated by the reference numeral 6, which receives in input the ramp signal which is proportional to the switching current during the ON step with the addition of a compensation ramp signal designated by the reference numeral 7.

The output of the amplifier 6, together with the output of an oscillator block 8, is sent to a duty cycle control logic block, designated by the reference numeral 9, the output whereof controls the DC-to-DC converter.

The transfer function of the circuit illustrated in FIG. 1 has a zero with a positive real part, the value whereof depends, among other factors, on the load conditions and on the value of the duty cycle, in addition to a pair of conjugate complex poles, which tends to generate overshooting in response to transients.

Figure 2:
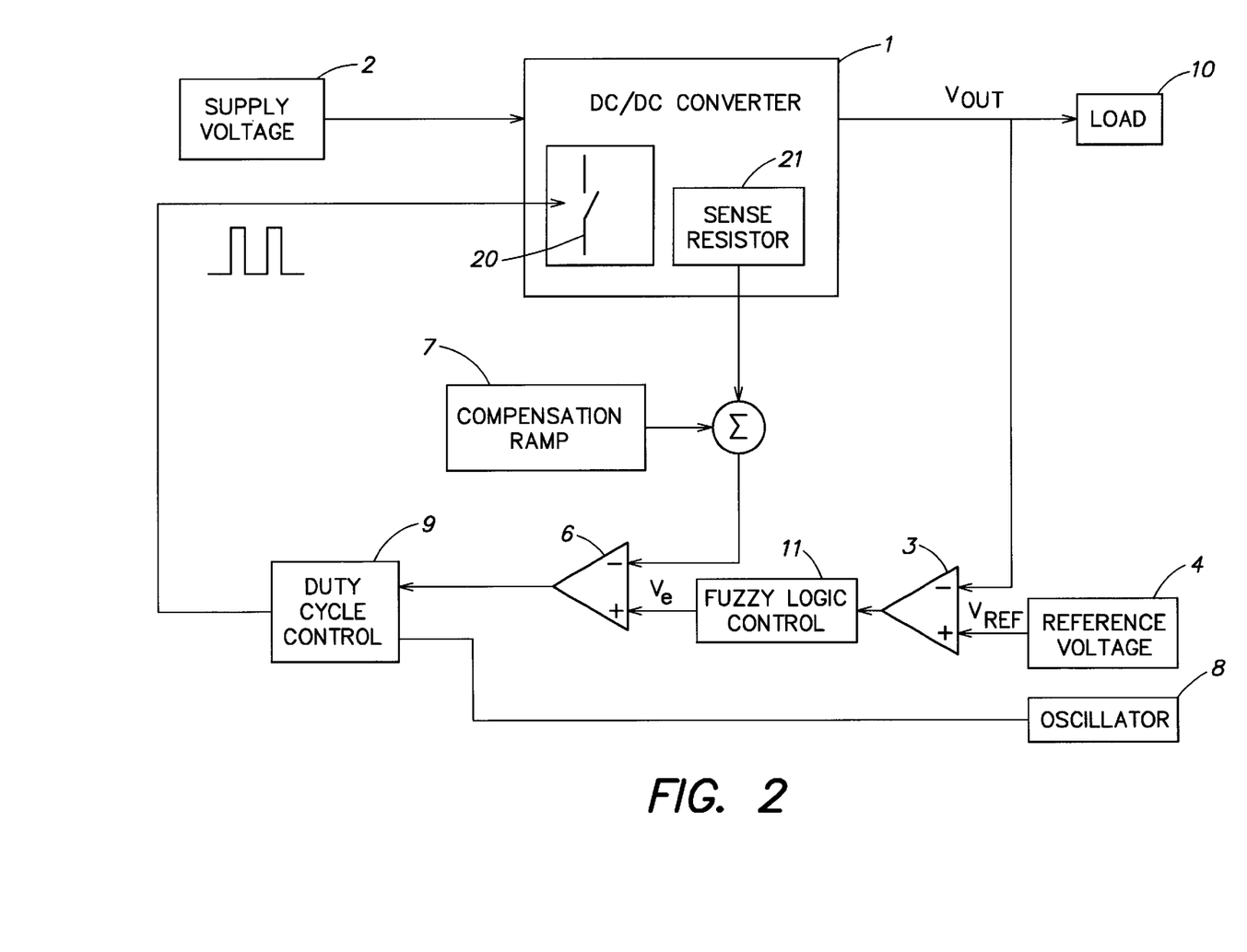
FIG. 2 is a block diagram of a fuzzy logic control with ramp compensation, according to the present invention.

It should be noted that in the diagram of FIG. 2 the reference numeral 10 designates a load to which the voltage in output from the DC-to-DC converter is sent.

This compensation method, however, is not effective for working over a wide range of load and supply conditions and also reduces the closed-loop gain of the regulating device, consequently reducing the dynamic performance.

A second approach to the above-mentioned problems is a current-mode fuzzy logic control, which is the subject of European patent application no. 94830328.4 filed on Jul. 1, 1994 in the name of this same Applicant, which is incorporated herein by reference. This approach uses an (external) fuzzy control algorithm whose operation is based on the acquisition of the input and output voltages, of the current across the inductor and optionally of the temperature of the power transistor.

This solution, however, cannot be easily implemented on a chip. Moreover, it is difficult to acquire the instantaneous value of the inductor current.

Fuzzy control of the duty cycle and optionally of the base current of the power transistor which also utilizes the temperature measured on the power transistor can also be complex and not easily implemented.

Another drawback of the approach proposed in the above-cited patent application is that the control system, as mentioned, is inadequate as an architecture to be used in an integrated regulator, since it is based on the measurement of values which are not available during all the operating steps in low-power systems with a high degree of circuit integration, high efficiency, and a minimal number of passive components and control inputs.

SUMMARY OF THE INVENTION

The aim of the present invention is therefore to provide a DC-to-DC converter which is capable of operating with a continuous-mode step-up or flyback configuration with integrated fuzzy logic current control.

Within the scope of this aim, an object of the present invention is to provide a DC-to-DC converter with integrated fuzzy logic current control which provides an architecture which is extremely simplified with respect to other conventional nonlinear control approaches, including hitherto known fuzzy-logic approaches.

Another object of the present invention is to provide a DC-to-DC converter with integrated fuzzy logic current control which can be integrated easily.

Another object of the present invention is to provide a DC-to-DC converter with integrated fuzzy logic current control in which the fuzzy logic controller is introduced together with the already-known compensation ramp, preserving its functionality so as to allow the system to deal with the above-cited problems that restrict its use during continuous-mode operation.

Another object of the present invention is to provide a DC-to-DC converter with integrated fuzzy logic current control in which the fuzzy logic controller block acts directly on the comparator block that provides the modulator for switching the power transistor on and off.

Another object of the present invention is to provide a DC-to-DC converter with integrated fuzzy logic current control which is highly reliable and relatively easy to manufacture and at competitive costs.

This aim, these objects and others which will become apparent hereinafter are achieved by a step-up (or flyback) continuous-mode DC-to-DC converter with integrated current control which comprises means for comparing a voltage signal in output from said converter and a reference signal for generating an error signal and means for generating a compensation ramp which is suitable to generate a ramp signal which is added to a signal which is proportional to a current ramp that flows across said converter, the signal output from said comparator means and the signal obtained from said sum being sent to additional comparator means, the output whereof, together with an oscillator signal, is sent to means for driving a power transistor of said converter, and fuzzy logic control means interposed between said comparator means and said additional comparator means, said fuzzy logic control means receiving as input the error signal output by said comparator means and providing as output a signal which is proportional to the variation of said error signal over time to be sent to said additional comparator means.

BRIEF DESCRIPTION OF THE DRAWINGS

Further characteristics and advantages of the invention will become apparent from the description of a preferred but not exclusive embodiment of the DC-to-DC converter according to the invention, illustrated only by way of non-limitative example in the accompanying drawings, wherein.

DETAILED DESCRIPTION

FIG. 2 illustrates a block diagram of the fuzzy logic control with ramp compensation according to the present invention.

In this control diagram, in which blocks that are similar to those of FIG. 1 have been assigned identical reference numerals, the output of the comparator 3 is sent to a fuzzy logic control, designated by the reference numeral 11, before being sent as a signal Ve to the comparator 6.

In this case, the fuzzy logic controller block 11 acts directly on the comparator block 6, which provides the PWM modulator for switching on and off the power transistor, designated by the reference numeral 20 in FIGS. 2 and 1.

Figure 3:
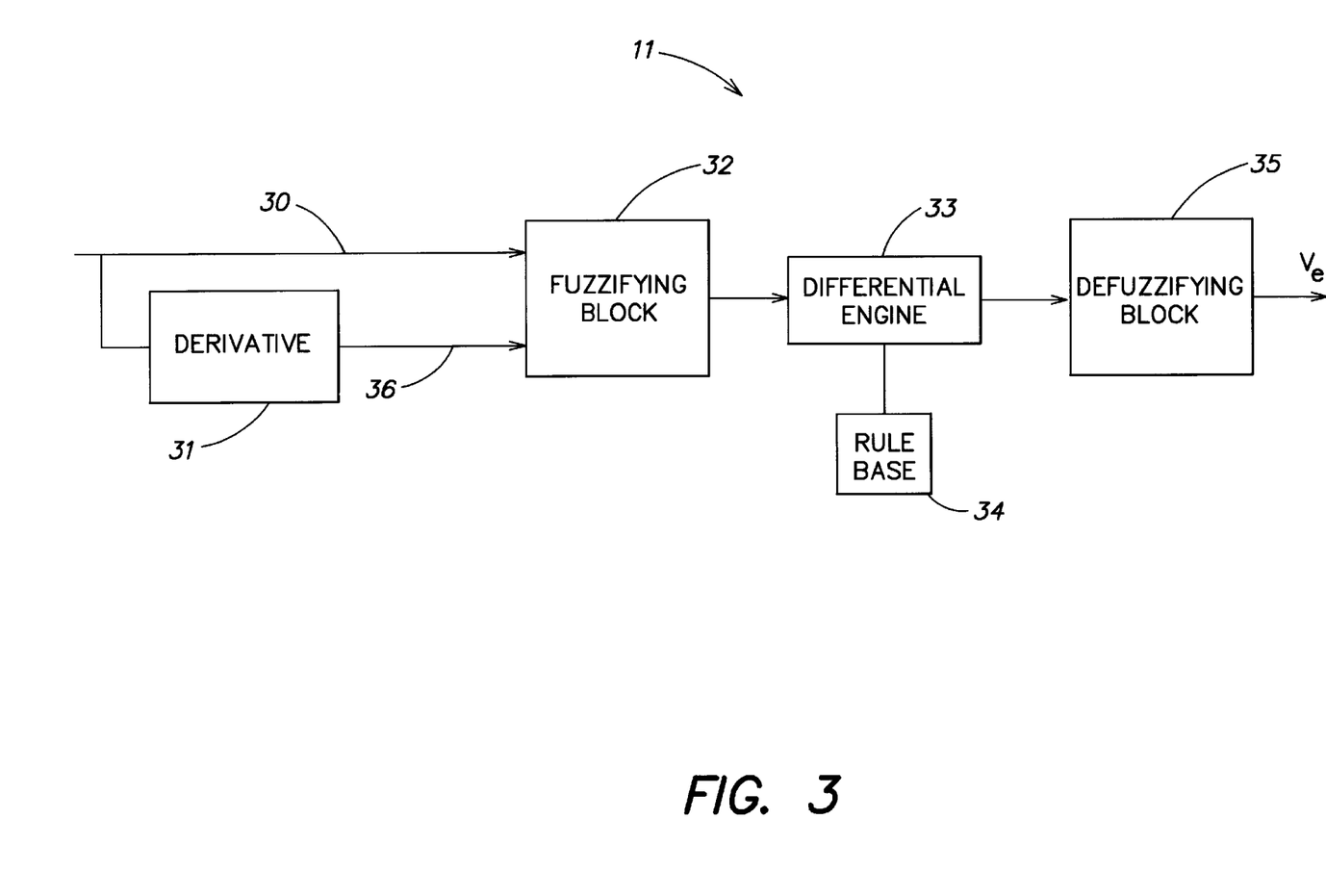
FIG. 3 is a detailed block diagram of the fuzzy logic control implemented in the control diagram shown in FIG. 2, according to the present invention.

FIG. 3 is instead a schematic block diagram of the fuzzy logic controller 11 included in the control diagram of FIG. 2.

In FIG. 3, the reference numeral 30 designates the error signal which is output by the comparator block 3. The block 31 calculates the derivative of the error over time in order to obtain a slope signal which is input, together with the error signal 30, to a fuzzifying block 32, the output whereof is sent to a differential engine 33 which receives as input a rule base 34 and communicates bidirectionally with said rule base.

The output of the differential engine 33 is sent to defuzzifying means 35, which provide as output an error voltage signal Ve which is then sent to the comparator block 6, as shown in FIG. 2.

Figure 4:
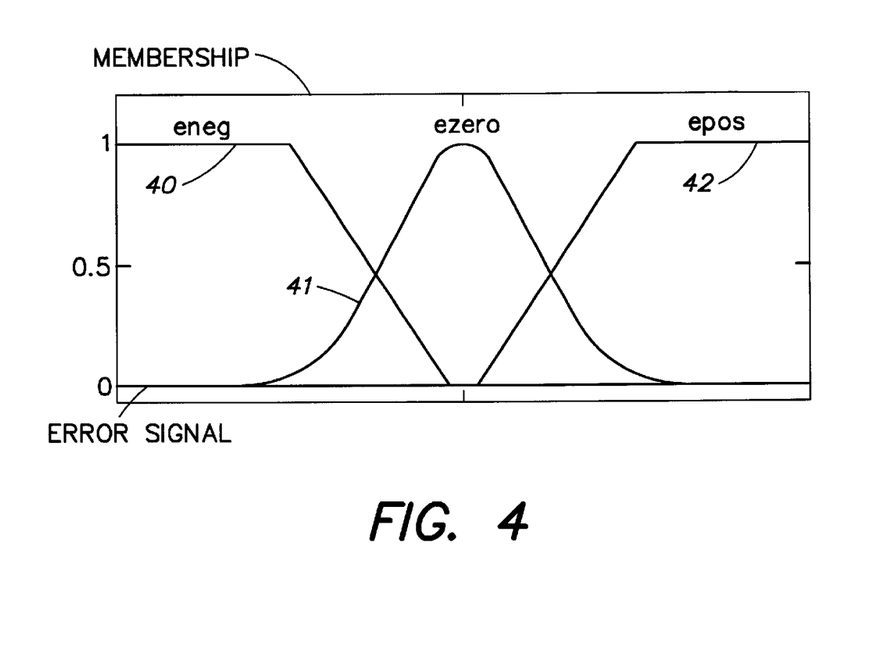
FIG. 4 plots the membership function for the error signal in the fuzzy controller according to the present invention.
Figure 5:
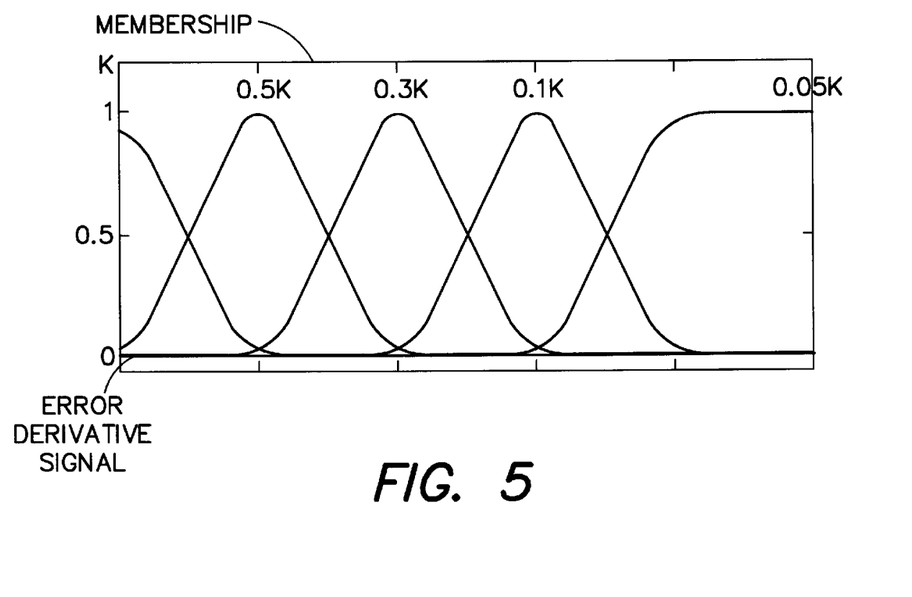
FIG. 5 plots the membership function for the error derivative signal in the fuzzy control according to the present invention.
Figure 6A:
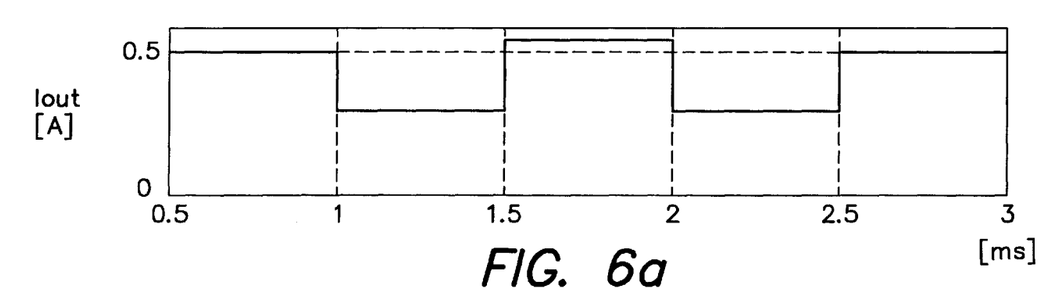
FIGS. 6A–6C respectively plot the behavior of the load current, of the output voltage and of the current on the inductor in a linear control of a known kind.
Figure 6B:
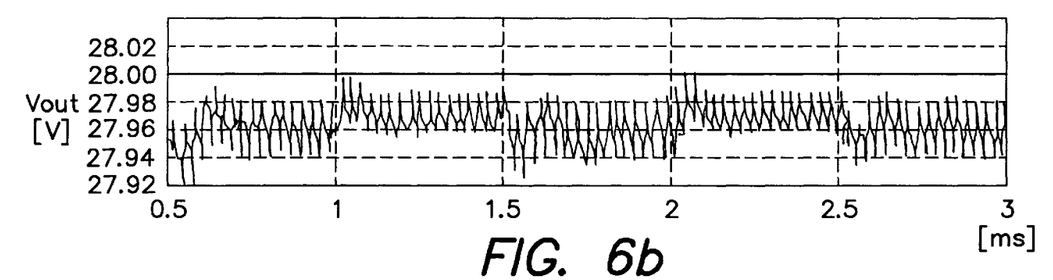
Figure 6C:
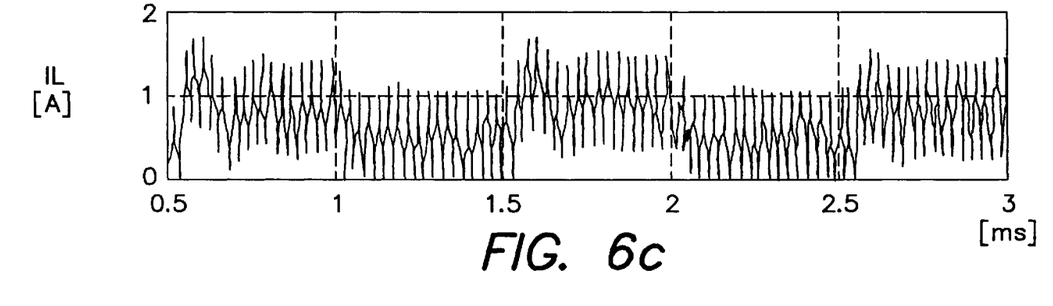
Figure 7A:
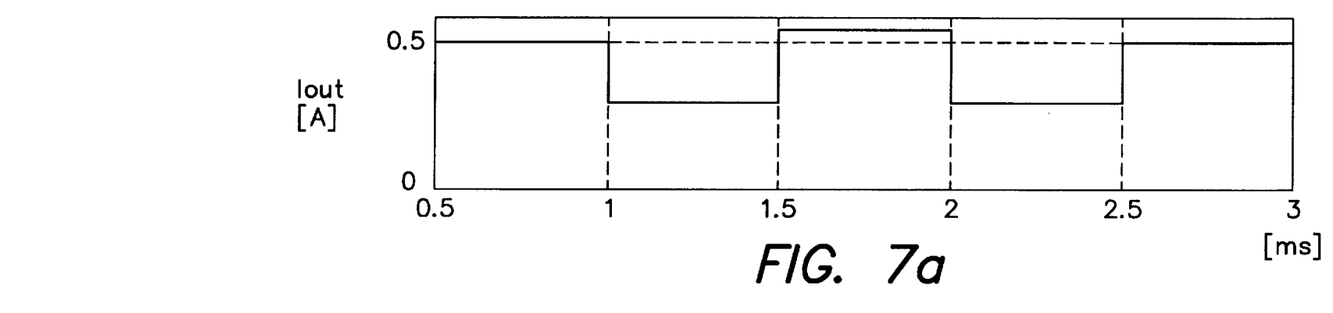
FIGS. 7A, 7B and 7C respectively plot the behavior of the load current, of the output voltage and of the inductor current in a fuzzy control according to the present invention, in contrast with the linear control plotted in FIGS. 6A–6C.
Figure 7B:
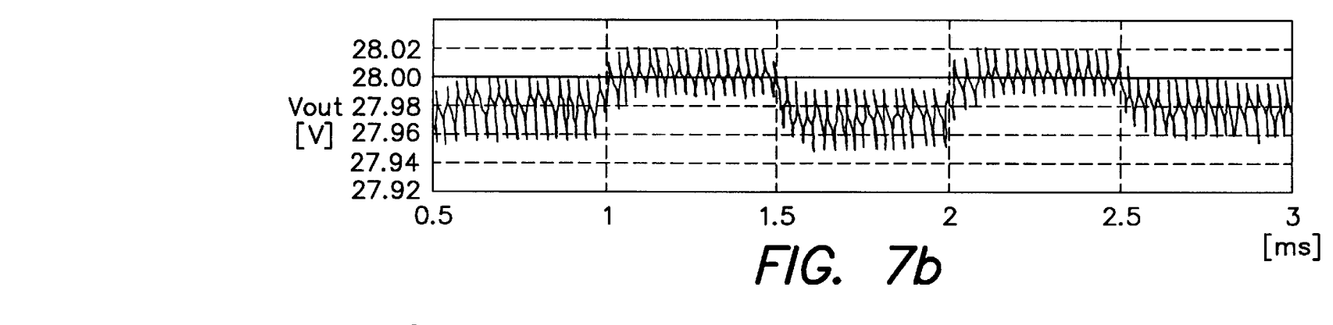
Figure 7C:
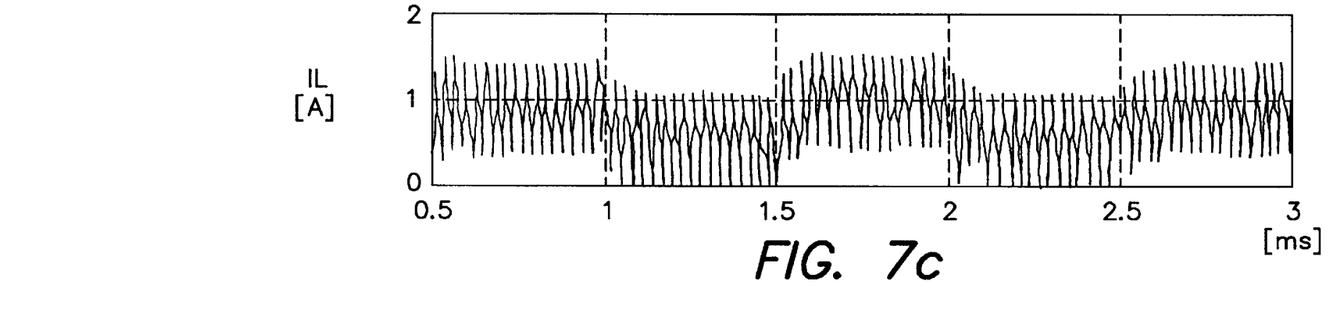
Figure 8A:
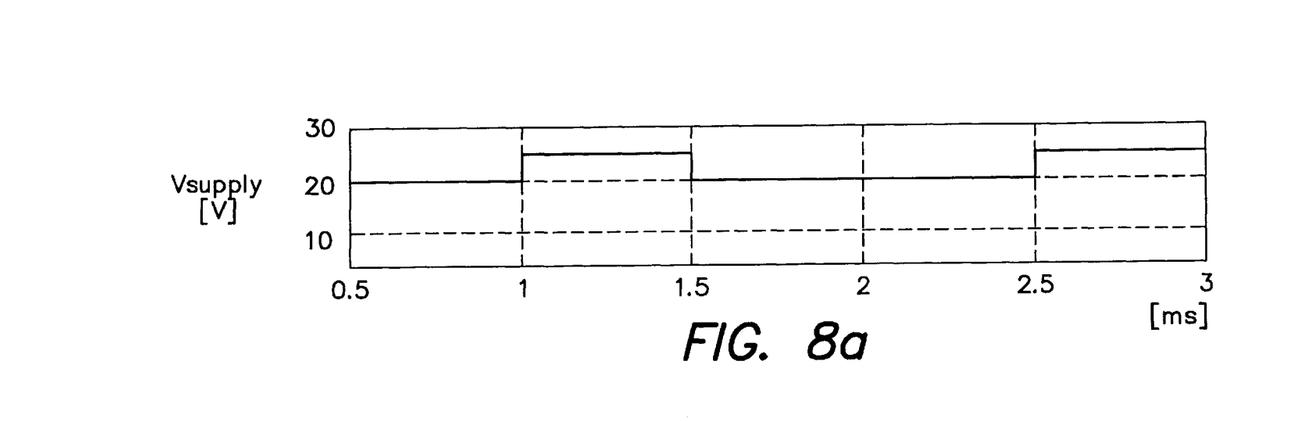
FIGS. 8A–8C respectively plot the behavior of the supply voltage, of the output voltage and of the inductor current in a linear control of a DC-to-DC converter with slope compensation.
Figure 8B:
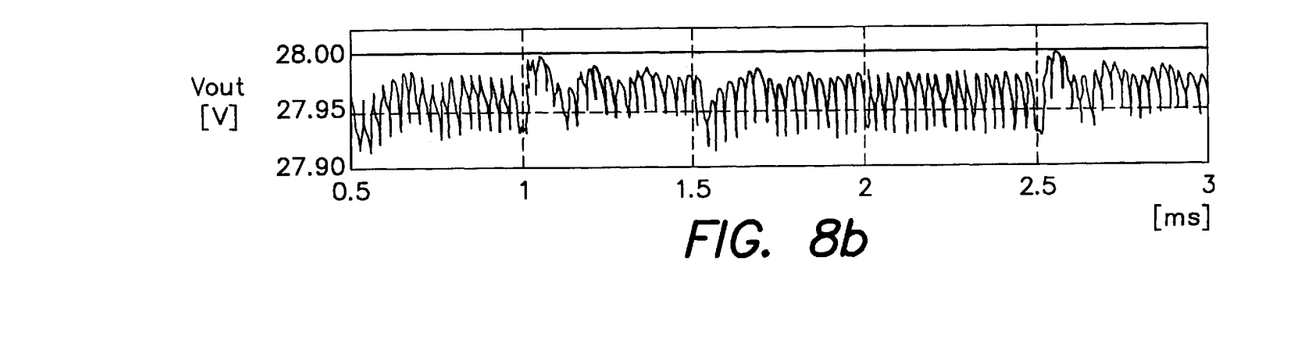
Figure 8C:
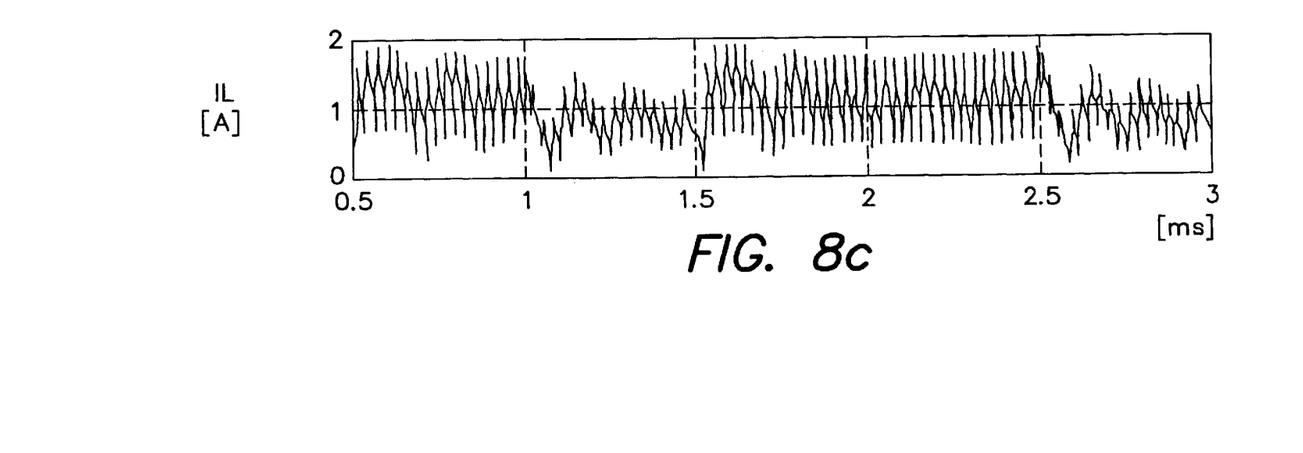
Figure 9A:
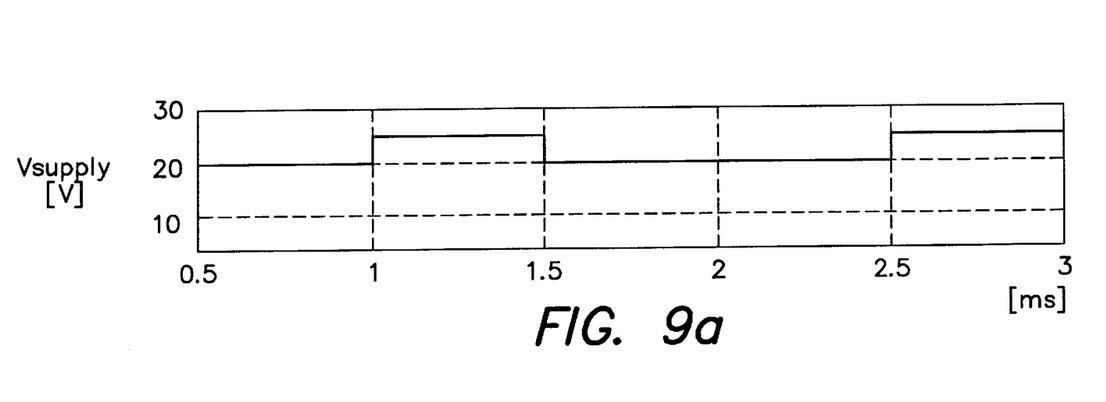
FIGS. 9A–9C respectively plot the behavior of the supply voltage, of the output voltage and of the inductor current in a fuzzy control of a DC-to-DC converter according to the present invention.
Figure 9B:
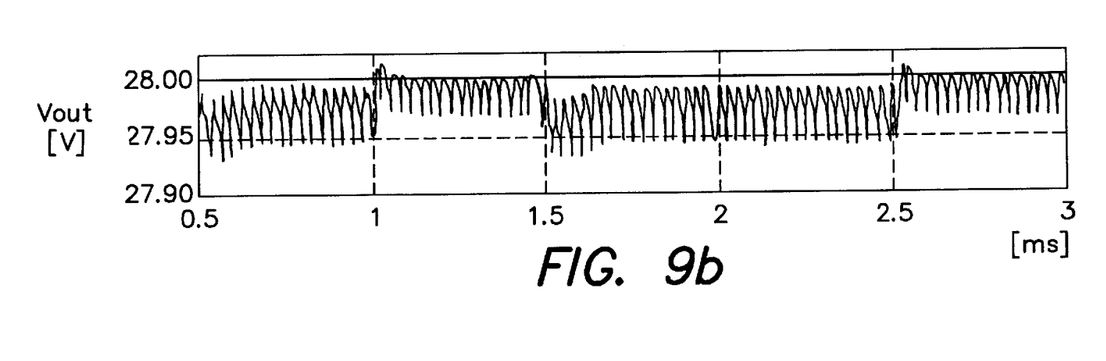
Figure 9C:
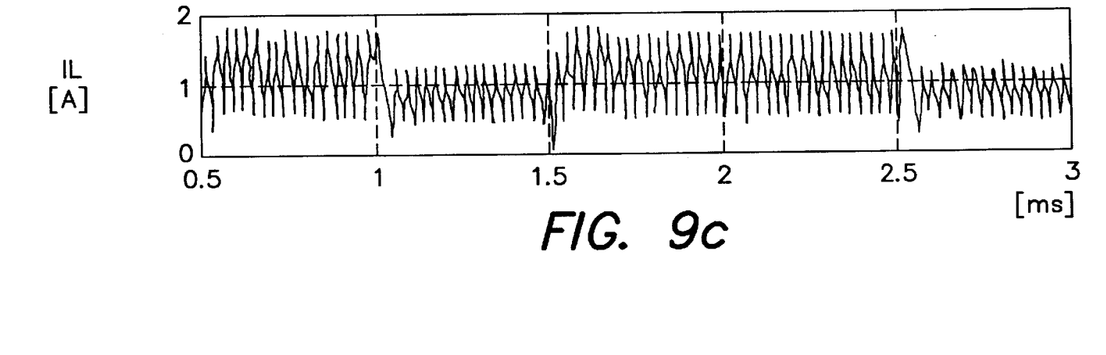

FIGS. 4 and 5 respectively plot the membership functions for the error signal 30 and for the derivative signal, designated by the reference numeral 36 in FIG. 3.

In FIG. 4, the term eneg relates to the membership function of the negative error, the term ezero relates to the membership function for the zero value of the error, and the term epos relates to the membership function for a positive error signal.

In FIG. 5, k designates the value of the slope of the error signal and therefore various membership functions of the error derivative signal 36 for different slope values, as k varies, are plotted.

The following Table 1 lists the fuzzy logic rules in the example shown in FIG. 3 and in FIG. 2.

TABLE 1

| IF (error is 'neg') | then y1 is 0 |
| IF (error is 'zero') and (slope is 'k') | then y2 is 0 |
| IF (error is 'zero') and (slope is '0.5k') | then y3 is 0.2 |
| IF (error is 'zero') and (slope is '0.3k') | then y4 is 0.4 |
| IF (error is 'zero') and (slope is '0.1k') | then y5 is 0.6 |
| IF (error is 'zero') and (slope is '0.05k') | then y6 is 0.8 |
| IF (error is 'pos') | then y7 is 1 |

$$Ve = \sum_{i=1}^{nrules} (\mu_i \cdot y_i); \mu_i = \text{rule\_activation\_degree\_i}$$

From the above description it is possible to deduce that this solution entails the following advantages:

the circuit that implements the fuzzy logic regulator block, shown in FIG. 3, can be easily integrated on silicon together with the normal signal and power circuits.

Moreover, a signal which is proportional to the current of the inductor is acquired only during the power-on step in order to use it in the current loop in the integrated circuit that provides the converter, as a partition of the emitter current of the power transistor 20: this produces a practically negligible loss in the power efficiency of the regulator and does not entail the use of external sense resistors in addition to the sense resistor 21 for the DC-to-DC converter 1 or of secondary windings on the inductor.

The control action acts on the transfer function in a nonlinear manner within the voltage loop, compensating for the negative effects of load variations.

The proposed control diagram can be applied to all regulators with current-mode control, requiring at the most the setting of the fuzzy logic control parameters (i.e., of the position of the membership functions in the antecedents and conclusions).

FIGS. 6A–6C and 7A–7C illustrate the load regulation behavior, obtained by simulation, of the circuit with linear control and fuzzy control respectively. The figures clearly show that in order to ensure stability of the control loop when the gain or stage of the voltage loop is equal, in the linear case it is necessary to use a slope value for the compensation ramp, i.e. a value of k, which is higher than the value used in the case of the fuzzy nonlinear controller according to the present invention. This entails a drastic reduction in the loop gain in the linear case, when the operating mode of the converter changes from discontinuous to continuous, with a consequent increase in the value of the duty cycle. Accordingly, by using a linear regulator in the control architecture at issue, even if it is a well-compensated one, the result is a less advantageous load regulation value than in the fuzzy-logic solution.

FIGS. 8A–8C and 9A–9C instead plot the line regulation behavior, obtained by simulation, of the circuit with linear control and with fuzzy control respectively. The same remarks made above also apply to the case of line regulation: the loss of performance as the input voltage varies in the case of linear control can be ascribed here to the lower unit value of the loop, which ensures the stability of the control action, that can be obtained with respect to the value obtained by using the fuzzy controller. Analysis of FIGS. 6A–9C therefore clearly shows that the adoption of a nonlinear control system, integrated in an architecture of the current-mode type, is capable of improving the static performance of the control system in addition to ensuring better and more stable dynamic performance in terms of speed of response to transients and to overshoot sequences.

The circuit that implements the fuzzy logic controller is designed to be included in a specifically designed integrated DC-to-DC converter architecture with a minimal area increase.

Figure 10:
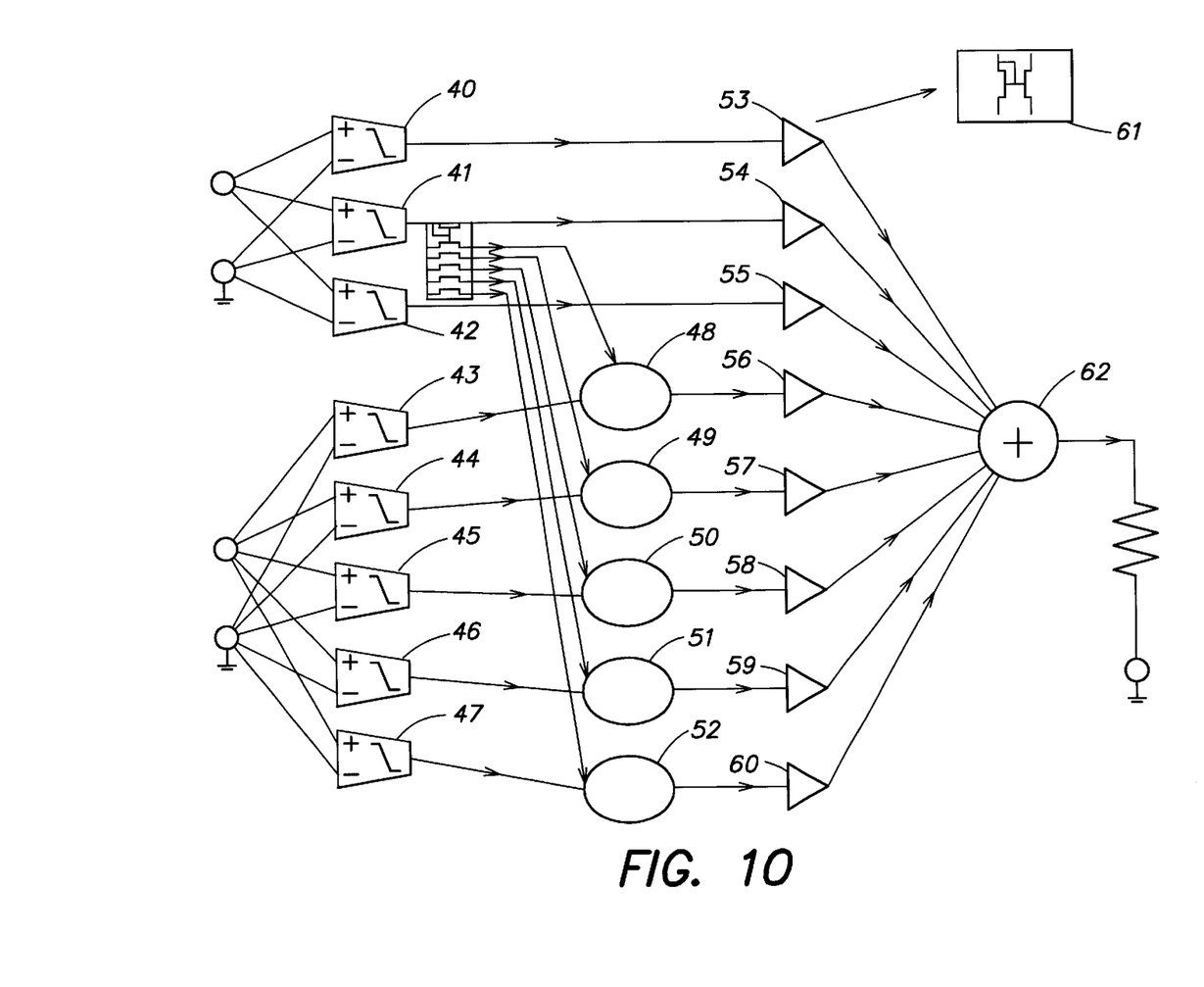
FIG. 10 is a circuit diagram, in block form, of the fuzzy controller for DC-to-DC converter according to the present invention.

Therefore, with reference to FIG. 10 a possible circuit diagram which implements the block diagram of the fuzzy control illustrated in FIG. 3 is shown.

FIG. 10 illustrates the analog circuit blocks that provide the above-cited fuzzy controller.

As regards the fuzzy antecedent part, each membership function is provided by means of transconductance operational amplifiers with suitably designed transconductance functions. In FIG. 10, the reference numeral 40 designates the membership function "eneg" shown in FIG. 4; the reference numeral 41 designates the membership function "ezero" shown in FIG. 4; and the reference numeral 42 designates the membership function "epos" shown in FIG. 4. Accordingly, the blocks 40, 41 and 42 illustrate the membership functions for the error signal 30, designated by $V_{error}$ in FIG. 10. As regards the error signal derivative signal, designated by the reference numeral 31 in FIG. 3 and by $Vderiv_i$ in FIG. 10, the membership functions are indicated respectively by he blocks 43–47, which correspond to the membership functions shown in FIG. 5 for values of the slope k which vary between 1 and 0.05.

Membership functions of the "eneg" and "epos" type are implemented by means of a single controlled-transconductance differential block, while the bell-shaped functions of the "ezero" type are obtained by performing the current sum of the characteristics of saturation differential blocks.

The resulting currents are filtered by filtering means, designated by the reference numerals 48, 49, 50, 51 and 52, which allow the lowest of the two currents to pass for fuzzy rules with "AND"-type logic (as an alternative, it is possible to implement multiplier circuits with Gilbert cells or equivalent devices, to implement the product of the degrees of membership of the inputs in the respective fuzzy sets, or, for fuzzy operators of the OR type, it is possible to use circuits which produce currents whose value is equal to the maximum input current), so as to provide, for each rule, the fuzzy differential engine 33.

Finally, for the implementations of the defuzzifying means 35, since it is necessary to calculate a weighted sum, with respect to the values of the conclusions of the fuzzy rules, of the currents produced for each fuzzy rule, current-gain blocks, designated by the reference numerals 53, 54, 55, 56, 57, 58, 59 and 60 are used; said blocks can be obtained by means of circuits of the current-mirror type, designated by the reference numeral 61 by way of example in FIG. 10.

The total sum of the currents is obtained in the adder node 62.

In practice it has been observed that the DC converter with fuzzy control combined with ramp compensation achieves the above aim, since it combines the advantages, in terms of speed of response to the input transients that are typical of current-mode control, with the flexibility of a fuzzy control system in the voltage loop, extending the stability range of the system beyond the limits set by conventional control systems.

For the correct operation of the fuzzy logic controller block it is sufficient to supply as input the error signal of the output voltage with respect to the reference voltage, from which a signal is obtained which is proportional to its variation over time: this leads to a compact diagram featuring simple circuit implementation.

The fuzzy logic controller block acts directly on the comparator block that provides the PWM modulator for switching on and off a power transistor.

The DC-to-DC converter thus conceived is susceptible of numerous modifications and variations, all of which are within the scope of the inventive concept; all the details may also be replaced with other technically equivalent elements.

In practice, the materials employed, so long as they are compatible with the specific use, as well as the dimensions, may be any according to requirements and to the state of the art.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A step-up DC-to-DC converter capable of operating in continuous mode with integrated current control, comprising means for comparing a voltage signal in output from said converter and a reference signal for generating an error signal and means for generating a compensation ramp which is suitable to generate a ramp signal which is added to a signal which is proportional to a current ramp that flows across said converter, the signal output from said comparator means and the signal obtained from said sum being sent to additional comparator means, the output whereof, together with an oscillator signal, is sent to lock means for driving a power transistor of said converter, and fuzzy logic control means interposed between said comparator means and said additional comparator means, said fuzzy logic control means receiving as input the error signal output by said comparator means and a signal which represents the derivative of said error signal over time, and providing as output a signal which is proportional to the variation of said error signal over time to be sent to said additional comparator means.

2. A DC-to-DC converter according to claim 1, wherein said fuzzy logic control means comprise fuzzifying means which receive in input said error signal and said signal which represents the derivative of said error signal over time; differential engine means which are cascade-connected to said fuzzifying means and are connected to a rule base; defuzzifying means being provided which are cascade-connected to said differential engine means to generate the signal that is suitable to be sent to said additional comparator means.

3. A DC-to-DC converter according to claim 2, wherein said fuzzifying means comprise membership functions for said error signal and said error signal derivative signal.

4. A DC-to-DC converter according to claim 1, wherein said rule base comprises rules having fuzzy antecedents and crisp or fuzzy conclusions.

5. A DC-to-DC converter according to claim 3, wherein each membership function is provided by means of a transconductance operational amplifier for generating currents, said currents being filtered in filtering means which are suitable to allow the passage of the lowest value of each pair of currents obtained respectively from the error signal and from the error signal derivative signal.

6. A DC-to-DC converter according to claim 2, wherein said defuzzifying means comprise current-gain blocks which receive as input the currents output from said filtering means.

7. A DC-to-DC converter according to claim 6, wherein said current-gain blocks are provided by means of circuits of the current-mirror type.

8. A DC-to-DC converter according to claim 2, wherein the output signals of said defuzzifying means are added, through adder means, to generate said signal suitable to be sent to said additional comparator means.

9. A method for controlling a continuous mode DC-to-DC converter with integrated current control, comprising the steps of:

sensing a difference between an output voltage of said converter and a reference voltage in order to obtain an error signal and a signal representative of the derivative over time of said error signal;

sensing a current of said converter and adding thereto a compensation current ramp; and a fuzzy logic control step, the output signal whereof is sent, together with said signal obtained from the sum of the sense current of said converter and of the ramp current, to additional comparator means, the output whereof, together with an oscillator signal, is used to drive a power transistor of said converter.

10. A method according to claim 9, wherein said fuzzy logic control step comprises:

sending to fuzzifying means said error signal and said signal which is the derivative of said error signal;

generating, by means of a rule base constituted by antecedents and conclusions, current signals for providing a fuzzy differential engine;

defuzzifying said current signals, calculating a weighted sum of said current signals produced for each fuzzy rule.

11. A method according to claim 10, wherein said fuzzy logic control is integrated on silicon together with the power signal circuit.

12. A step-up DC-to-DC converter having integrated current control provided by a fuzzy logic current control circuit that comprises:

a first comparator for comparing a voltage output signal from said converter with a reference signal to generate an error signal;

a circuit coupled from said converter for generating a compensation ramp signal related to a current ramp that flows across said converter;

a second comparator for receiving at one of its inputs the compensation ramp signal and having its output coupled to the converter for driving a power transistor of the converter;

and fuzzy logic control means interposed between the first and second comparators, receiving at its input the error signal from the first comparator, and providing at its output a signal coupled to a second input of the second comparator;

said fuzzy logic control means including;
first circuit means for receiving the error signal output by the first comparator,
and second circuit means for providing a signal which represents the derivative of the error signal over time.

13. A DC-to-DC converter according to claim 12, wherein said fuzzy logic control means comprise fuzzifying means which receive in input said error signal and said signal which represents the derivative of said error signal over time; differential engine means which are cascade-connected to said fuzzifying means and are connected to a rule base; defuzzifying means being provided which are cascade-connected to said differential engine means to generate the signal that is suitable to be sent to said additional comparator means.

14. A DC-to-DC converter according to claim 13, wherein said fuzzifying means comprise membership functions for said error signal and said error signal derivative signal.

15. A DC-to-DC converter according to claim 12, wherein said rule base comprises rules having fuzzy antecedents and crisp or fuzzy conclusions.

16. A DC-to-DC converter according to claim 15, wherein each membership function is provided by means of a transconductance operational amplifier for generating currents, said currents being filtered in filtering means which are suitable to allow the passage of the lowest value of each pair of currents obtained respectively from the error signal and from the error signal derivative signal.

17. A DC-to-DC converter according to claim 13, wherein said defuzzifying means comprise current-gain blocks which receive as input the currents output from said filtering means.

18. A DC-to-DC converter according to claim 17, wherein said current-gain blocks are provided by means of circuits of the current-mirror type.

19. A DC-to-DC converter according to claim 13, wherein the output signals of said defuzzifying means are added, through adder means, to generate said signal suitable to be sent to said additional comparator means.

* * * * *